United States Patent
Taylor

[15] 3,658,396
[45] Apr. 25, 1972

[54] BEARING SEAL ASSEMBLY
[72] Inventor: Clinton A. Taylor, Huron, Ohio
[73] Assignee: General Motors Corporation, Detroit, Mich.
[22] Filed: Jan. 25, 1971
[21] Appl. No.: 109,137

[52] U.S. Cl. ..........................308/187.2, 277/53, 277/94
[51] Int. Cl. .................................F16c 33/78, F16c 33/80
[58] Field of Search ..................308/187.1, 187.2; 277/94, 53

[56] References Cited

UNITED STATES PATENTS

| | | | |
|---|---|---|---|
| 2,655,392 | 10/1953 | Lighthall | 308/187.2 |
| 2,888,304 | 5/1959 | Kooistra | 308/187.2 |
| 2,902,300 | 9/1959 | Schultz | 308/187.2 |
| 3,428,375 | 2/1969 | Martin | 308/187.2 |
| 3,458,207 | 7/1969 | Conti | 308/187.2 |

FOREIGN PATENTS OR APPLICATIONS

| | | | |
|---|---|---|---|
| 793,407 | 4/1958 | Great Britain | 308/187.2 |

*Primary Examiner*—Martin P. Schwadron
*Assistant Examiner*—Barry Grossman
*Attorney*—J. L. Carpenter, E. J. Biskup and P. D. Sachtjen

[57] ABSTRACT

A seal assembly for the annular lubricant chamber between the inner and outer races of an anti-friction bearing includes an annular shield attached to the outer race which cooperates with a molded T-shaped seal mounted in a groove on the inner race. The seal has a radial web terminating in an enlarged seal body engaging the inner surface of the shield, the web being provided with an inner axial fin which resiliently engages the side of the groove for axially biasing the web and urging the seal body into operative sealing relationship with the ring and an outer axial fin which cooperates with the inner periphery of the shield to establish a labyrinth seal.

2 Claims, 4 Drawing Figures

PATENTED APR 25 1972
3,658,396
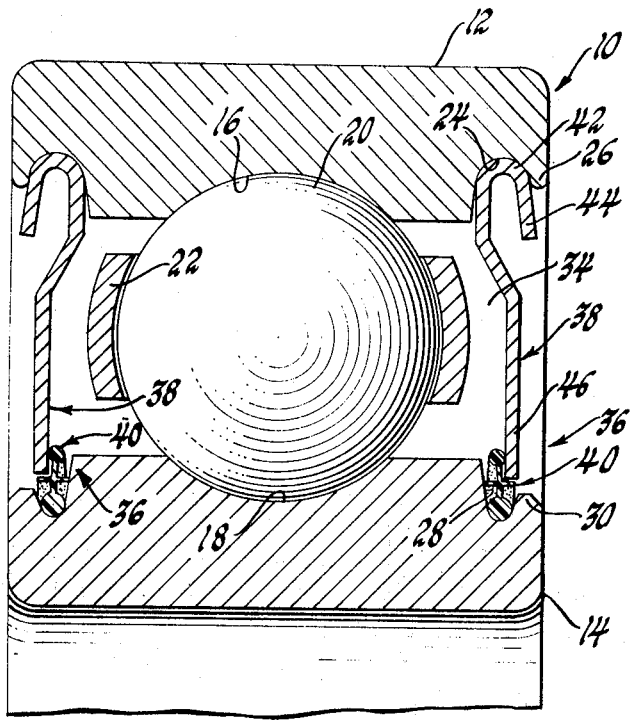
Fig.1
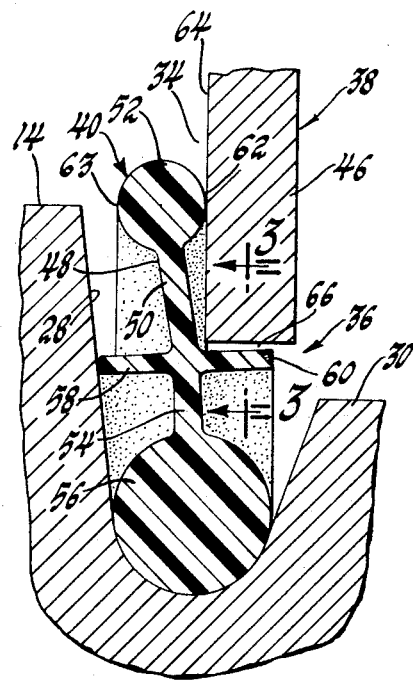
Fig.2
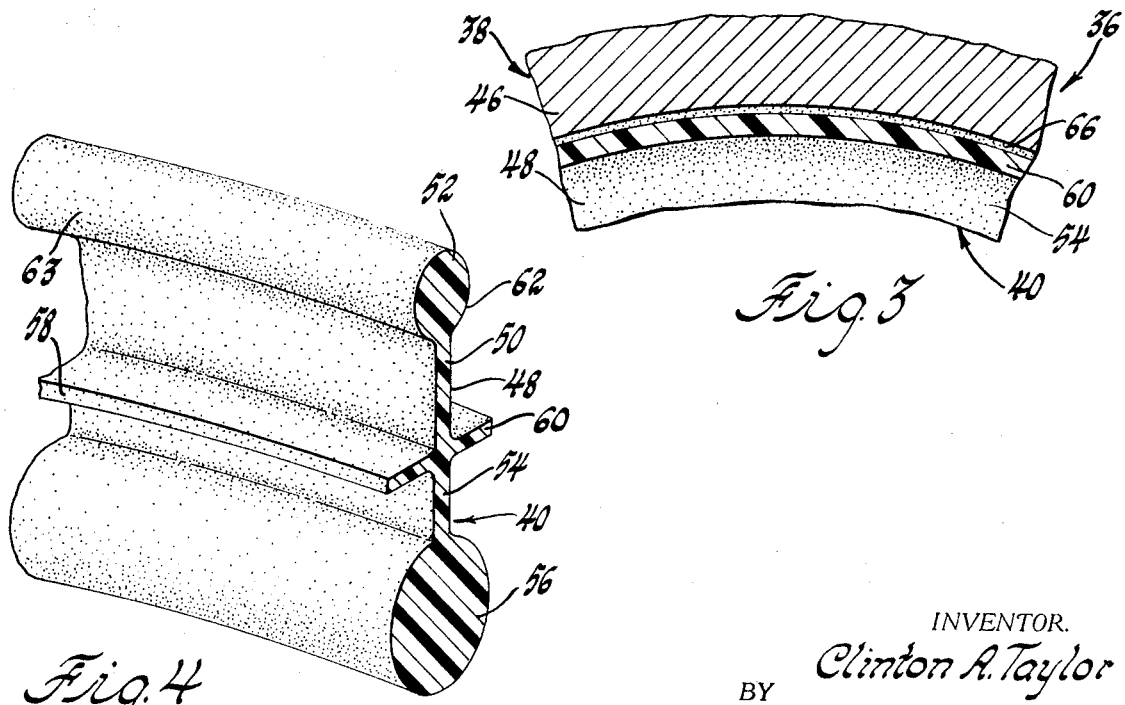
Fig.3
Fig.4
INVENTOR.
Clinton A. Taylor
BY
Peter O. Sachtjen
ATTORNEY

BEARING SEAL ASSEMBLY

The present invention relates to a sealing arrangement for dynamic and statically closing an annular space between a pair of relative rotatable members and, in particular, to a bearing seal assembly for the annular lubricant chamber between the bearing races which retains lubricants in the chamber and prevents the entrance of contaminants into the bearing.

Anti-friction elements such as ball bearings oftentimes are provided with shields or seals that limit the flow of lubricant through the bearing, prevent the outward flow of such lubricant, and effect a barrier against the ingress of contaminants which can score or otherwise damage the bearing members and their raceways. One of the most common designs comprises interleaved metal shields mounted the races which, in combination with a packing material, operatively cooperate to prevent migration of contaminants and lubricants. This arrangement, in addition to being somewhat cumbersome, may distort and create a wedging relationship between the shields which can reduce the bearing precision. This problem can be alleviated by employing an elastomeric lip seal at the inner periphery of the shield. However, the lip is subject to wear and accordingly the biasing force necessary to maintain the sealing relationship is difficult to maintain over the service life of the bearing. Other constructions have proposed using the internal stresses in a conically expanded flat washer to provide the necessary biasing force for the operative sealing engagement with the shield. However, this type of construction uses elastomeric materials which tend to relax and take a permanent set after a period of time thereby reducing the biasing force below the level necessary to maintain reliable sealing.

The present invention contemplates a seal assembly for the annular lubricant chamber between the inner and outer races of a ball bearing wherein a one-piece elastomeric seal is configured to be operatively retained without experiencing a compressive set and includes integral biasing means for constantly urging a sealing surface into static and dynamic sealing relationship with the bearing shield. More particularly, the seal is in the form of a molded elastomer having a generally T-shape as defined by a relatively thin radial web which terminates at its inner and outer margins with enlarged toroidal beads. The outer bead includes an annular axially facing surface adapted to sealingly engage the shield and establish a positive barrier to the flow of lubricant from the bearing and prevent ingress of contaminants into the bearing cavity.

The seal also includes a pair of annular fins which project axially of the web. The inboard fin compressively engages the side of the retaining groove thereby outwardly bowing the web so as to create an axial biasing force for maintaining the seal in operative sealing relationship with the shield under static and dynamic conditions. By columnarly loading the axial fin and bowing the web to establish the biasing force, extreme stresses are avoided within the seal while maintaining sufficient biasing through the life of the bearing despite expected wear of the sealing surface. The outboard fin has a slight clearance fit with the inner diameter of the shield so as to establish a labyrinth seal which functions as an annular orifice for further restricting the flow of lubricants and contaminants.

These and other features of the present invention will be apparent to one skilled in the art upon reading the following detailed description, reference being made to the accompanying drawings illustrating a preferred embodiment in which:

FIG. 1 is a fragmentary cross sectional view of an anti-friction roller bearing incorporating a seal assembly made in accordance to the present invention;

FIG. 2 is an enlarged sectional view showing the operative sealing relationship between the seal, the bearing shield, and the retaining groove;

FIG. 3 is a view taken along line 3—3 of FIG. 2;

FIG. 4 is an enlarged perspective view of the subject seal.

Referring to the drawings, there is shown an anti-friction bearing 10 having an outer race 12 and an inner race 14. The races 12 and 14 are respectively provided with mutually facing annular raceways 16 and 18 which receive a plurality of balls 20 that are circumferentially spaced and guided by a bearing cage 22 for precision coaxial anti-friction rotation between the races 12 and 14. Additionally, the inner surface of the outer race 12 is provided with an inwardly opening generally J-shaped mounting groove 24 which laterally terminates at an annular shoulder 26. The inner race 14 is provided with a generally outwardly opening J-shaped retaining groove 28 which radially outwardly terminates at an annular frustoconical lip 30.

The outer race 12 and the inner race 14 define therebetween an annular lubricant chamber 34 which is closed by a two-piece seal assembly 36 comprising a bearing shield 38 and a seal 40. The seal assembly 36, in general, is designed to retain the proper amount of bearing lubricant within the chamber 34 throughout the life of the bearing 10 and, at the same time, prevent the ingress of outside contaminants into the chamber 34 which could detrimentally affect the precision and life of the anti-friction movement.

More specifically, the bearing shield 38 is in the form of an annular metallic ring having an outer diametral lip 42 and a radially inwardly turned flange 44. By a conventional forming operation such as crimping, the lip 42 and the flange 44 are radially outwardly expanded into conformity with the mounting groove 24 to thereby fixedly secure the bearing shield 38 to the outer race 12. The inner peripheral end 46 of the bearing shield 38 terminates closely adjacent the seal 40 and the lip 30. Thus, without benefit of the seal 30 or other modifications, the bearing 10 with the shield 38 functions as a conventional shielded bearing.

The seal 40 comprises a symmetrical one-piece molding of an elastomeric material and is generally T-shaped when viewed in radial cross section. More particularly, the seal 40 includes an annular radial web 48 having an upper arm 50 which terminates at an enlarged toroidal seal body 52, and an inner leg 54 which terminates at an enlarged toroidal mounting bead 56. A pair of annular fins 58 and 60 are centrally formed on the web 48 between the upper arm 50 and lower arm 54 and project axially inwardly and outwardly thereof.

The mounting bead 56, is assembly, is snapped over the lip 30 into the seal groove 28 with a slight diametral interference so as to lightly yieldingly engage the sides of the groove to mount the seal 40 on the inner race 14. The seal body 52 includes a pair of annular axially facing sealing surfaces 62, 63 which are adapted to respectively engage the inner surfaces 64 of the bearing shields 38. For mounting on the right hand side of the bearing 10, the surface 62 will be effective while the surface 63 will be effective when the seal 40 is mounted on the left hand side of the bearing 10. The sealing surface 62 is designed to engage surface 64 and establish a dynamic and static sealing interface thereby preventing the migration to fluid and contaminants so as to maintain lubricant within the chamber 24 and, at the same time, prevent the ingress of contaminants past the seal body 52.

In assembly, the fin 58 is designed to compressively engage the side of the groove 28 to outwardly bow the web 48 so as to establish an axial biasing force on the seal body 52 and urge the sealing surface 62 into an operative sealing relationship with the surface 64. In this manner, the fin 58 will be columnarly loaded in a manner which establishes a large axial biasing force without creating excessive stresses in the web 48 or the fin 58 of the type causing the seal to take a permanent set. Accordingly, prolonged service life of the seal will be assured despite expected frictional wear at the sealing interface. As shown in FIGS. 2 and 3, the outboard fin 60 has a slight clearance with respect to the inner periphery of the end 46. This clearance forms an annular labyrinth 66 which establishes a restrictive orifice that further aids in sealing the chamber 34 against lubricant loss and contaminant ingress.

As previously mentioned, the low-stressed molded seal 40 described above is symmetrical in shape and may be installed on either side of the bearing without modification. The only difference is that the fins 58 and 60 are reversed in function such that the fin 58 establishes the labyrinth seal on the left hand side while the fin 60 engages the side of the groove 28 for establishing the axial biasing force. Further, inasmuch as the large axial biasing force is established by a seal with relatively small size, the annular periphery 46 of the shield 38 can terminate relatively close to the lip 30. Thus, with the seal 40 removed, the bearing functions as a conventionally shielded construction without requiring any modification to the inner race.

Although only one form of this invention has been shown and described, other forms will be readily apparent to those skilled in the art. Therefore, it is not intended to limit the scope of this invention by the embodiment selected for the purpose of this disclosure but only by the claims which follow.

What is claimed is:

1. In an anti-friction bearing having a pair of race members defining an annular space to be sealed, a seal assembly in said annular space comprising: an annular ring member fixedly retained on one of the race members; an annular one-piece flexible seal including a radial web terminating at each end with an enlarged end section, one of said enlarged end sections adapted to be retained on the other of said race members and the other of said enlarged end sections adapted to engage said ring member; and a flexible fin axially projecting from said web and resiliently engageable said other of said race members for urging the other of said enlarged end sections into operative sealing engagement with said ring member to establish a static and dynamic sealing relationship and thereby prevent the flow of fluid and contaminants with respect to said annular space.

2. A seal assembly for an anti-friction bearing having cylindrical relatively rotatable inner and outer races which define an annular chamber wherein mutually facing annular grooves are formed in the races, said seal assembly comprising: an annular shield having the outer periphery thereof fixedly retained within the groove in the outer race and the inner periphery thereof deposed closely adjacent said inner race; and a T-shaped molded elastomeric seal including an annular radial web having axially projecting annular fins formed on either side thereof, said web having an enlarged sealing body formed at the outer periphery thereof which is engageable with said shield and having an enlarged inner bead formed at the inner periphery thereof which is received within the groove on the inner race to mount the seal on the latter, one of said fins resiliently engaging the side of the groove in the inner race for outwardly biasing the web and urging the seal body in continuous operative static and dynamic sealing relationship with said shield to prevent the flow of fluid and contaminants with respect to said cavity, and the other of said fins having a closely fitted relationship to establish a labyrinth seal with the inner periphery of the shield and further restrict the flow of fluid with respect to the chamber.

* * * * *